United States Patent [19]

Kneeland

[11] Patent Number: 4,993,664
[45] Date of Patent: Feb. 19, 1991

[54] EQUILIBRIUM BALLAST APPARATUS FOR LIGHTER-THAN-AIR BALLOONS AND METHOD FOR USING SAME

[76] Inventor: Howard A. Kneeland, 15 Farver La., Silver Bay, Minn. 55614

[21] Appl. No.: 342,164

[22] Filed: Apr. 24, 1989

[51] Int. Cl.$^5$ .............................................. B64B 1/70
[52] U.S. Cl. ...................................... 244/94; 446/220
[58] Field of Search ...................... 244/94, 93, 31, 96, 244/97; 446/220, 222, 225

[56] References Cited

U.S. PATENT DOCUMENTS 2,742,246  4/1956  Mellen .................................. 244/31
2,904,285  9/1959  Huch ..................................... 244/94

Primary Examiner—Joseph F. Peters, Jr.
Assistant Examiner—Anne E. Bidwell
Attorney, Agent, or Firm—Moore & Hansen

[57] ABSTRACT

A ballast apparatus comprising a thin-walled plastic tube containing an open-celled plastic foam or other wicking material which may be selectively impregnated with a liquid which evaporates in air at room temperature. The tube defines an aperture through which the liquid may evaporate, the diameter of the aperture and the density and molar heat of vaporization of the liquid being such that the weight of the liquid which evaporates over time balances the reduction in buoyancy as gas particles diffuse through the balloon over the same time period. A control slide permits the user to adjust the mount of the wicking material exposed to or through the aperture. The ballast apparatus has a widened blade section which may be easily gripped by the user, and includes a tethering opening for attaching a cord or ribbon. The ballast apparatus is secured to the interior or exterior surface of the neck of the balloon using a double-faced adhesive tape.

12 Claims, 2 Drawing Sheets 4,993,664

EQUILIBRIUM BALLAST APPARATUS FOR LIGHTER-THAN-AIR BALLOONS AND METHOD FOR USING SAME

BACKGROUND OF THE INVENTION

This invention relates generally to ballast devices for lighter-than-air balloons, and particularly to a method and apparatus for achieving long duration, controlled hovering at equilibrium with a Mylar-type balloon.

Lighter-than-air balloons are well known to the art. Many types of balloons are used for novelty and entertainment purposes, the more common employing helium, hydrogen, or heated air to provide buoyancy or lift. The preferred toy balloon uses one to five cubic feet of non-combustible helium which may be supplied from a tank or canister, and has traditionally been manufactured from a thin rubber or latex sheet material having an elongated neck which may be tied to provide a closure for the balloon. The materials used for such balloons are somewhat porous to helium gas, and the balloons rapidly lose their buoyancy in air as the helium diffuses through the material. A standard toy balloon may retain buoyancy sufficient to counterbalance its own weight for a period ranging from a few hours to several days in the case of weather-type balloons.

One recent development in the art is the "Mylar" balloon, which uses a plastic sheet material coated or impregnated on one side with a thin layer of a metallic foil or coating. Such a structure is far less permeable to helium and other gases, and positive buoyancy can easily be maintained for many days with such a balloon. A representative example of such a balloon structure is disclosed in U.S. Pat. No. 4,077,588 to Hurst. The neck portions of these Mylar balloons are generally sealed using thermal or electrosonic welding, or they may be closed with an adhesive application such as shown in U.S. Pat. No. 4,547,168 to Blacksberg. Because the Mylar balloons have much lower internal gas pressure than conventional rubber balloons, and because the internal gas diffuses more slowly, the reduction in buoyancy over time more closely resembles a linear relationship having a very gradual slope as compared to that for conventional rubber balloons.

The ability to maintain positive buoyancy in a balloon over long periods of time has invariably resulted in people attempting to attain a controlled equilibrium or hovering condition, and to sustain that "aerostatic" flight for as long as possible, rather than resorting to tethering the balloon. This permits the balloons to be left on display for extended periods of time, or used in games and recreational activities such as shown in U.S. Pat. No. 3,611,623 to Copstead. Mylar balloons have become very popular as gift items, with personal messages and greetings being printed on the face of the balloon, and for advertising or promotional devices.

The art contains many methods and apparatuses designed to achieve and maintain static equilibrium flight, as well as to simulate larger-scale flying devices such as hot air balloons or dirigibles. Some recent examples of these ballast devices may be seen in U.S. Pat. Nos. 4,145,838 to Mason; 4,356,661 to Calderwood; and 4,758,199 to Tillotson.

However, as the buoyancy of the balloon decreases due to loss of helium, the weight of the ballast and balloon will eventually exceed the buoyant lift of the gas, and the balloon will lose its ability to hover.

One solution to this problem is shown in U.S. Pat. No. 4,547,167 to Bergmann, which discloses a plurality of paper counterbalancing strips having perforated sections which may be torn off to incrementally decrease the weight of the ballast as the buoyancy of the balloon decreases. The sections are arranged symmetrically on the balloon, and removed in a preselected order to maintain the balloon in its proper attitude.

Such an apparatus has several drawbacks. Because Mylar balloons lose their buoyancy very slowly, the incremental changes caused by removing pairs of the ballast sections can be too great a decrease in the counterweight, thereby increasing the loft of the balloon and requiring it to be tethered. The strips also interfere with the markings or insignias on the balloon face, which are often the principal reason for displaying the balloon. The strips cannot subsequently be reused on other balloons, and cannot easily be completely removed and later reapplied to the same balloon if it is desired to utilize the full loft of the balloon for a period.

The Calderwood '661 patent referenced above provides one means to remedy some of these problems. The Calderwood '661 devices utilizes a container which may be filled with a liquid such as water. The container defines a small aperture through which the liquid may be introduced into the container by suction after the container is deformed, and small amounts of the liquid may be ejected from the container to achieve a precise counterweight by similarly deforming the container. The aperture is small enough that surface tension prevents the fluid from escaping, but permits the user to adjust the ballast weight continuously rather than incrementally.

The Calderwood '661 device also presents some problems. Due to the size and weight of the container, the amount of water necessary to permit controllable weight adjustments, and the weight of the mounting assembly, the device has proven useful with larger volume balloons having greater lifting capacity, but not the Mylar type balloons such as are sold for novelty or greeting purposes. Similarly, a balance mass is necessary to correct the attitude of the balloon, which additionally limits the utility of the device to larger balloons. The apparatus also has a tendency to lose ballast if jarred or handled carelessly, and the user must then recalibrate the liquid counterweight to regain the proper equilibrium, a process that is time consuming.

Moreover, devices similar to both the Calderwood '661 and Bergmann '167 ballast apparatuses require periodic or frequent readjustment by the user, and do not permit truly unrestrained continuous free flight over periods equal to the duration of a Mylar balloon's sustained buoyancy.

BRIEF SUMMARY OF THE INVENTION

It is therefore one object of this invention to design an equilibrium ballast apparatus for a Mylar-type lighter-than-air balloon which may be used to sustain controlled aerostatic flight for a period of many days without maintenance or recalibration by its user, and which therefore automatically adjusts to the gradual decrease in buoyancy of the balloon as its buoyant gas diffuses over time.

It is another object of this invention to design the above ballast apparatus such that it maintains a symmetrical relationship to the balloon and does not necessitate additional means for attitude correction.

It is an additional object of this invention to design the above ballast apparatus such that it may be reused repeatedly, or may be disposable.

It is a related object of this invention to design the above ballast apparatus such that it may be easily and selectively removed from the balloon and replaced on the balloon whenever desired.

It is a yet another object of this invention to design the above ballast apparatus such that it will not be affected by jarring or rough handling.

It is a distinct object of this invention to design the above ballast apparatus such that it may be applied to Mylar-type balloons having imprinted messages or insignias without detracting from the appearance of the balloon, and may preferably remain unobserved in normal use of the balloon.

Briefly described, the ballast apparatus of this invention comprises a thin-walled plastic tube containing an open-celled plastic foam or other wicking material which may be selectively impregnated with a liquid which evaporates in air at room temperature. The tube defines an aperture through which the liquid may evaporate, the diameter of the aperture and the density and molar heat of vaporization of the liquid being such that the weight of the liquid which evaporates over time balances the reduction in buoyancy as gas particles diffuse through the balloon over the same time period. A control slide permits the user to adjust the mount of the wicking material exposed to or through the aperture. The ballast apparatus has a widened blade section which may be easily gripped by the user, and includes a tethering opening for attaching a cord or ribbon. The ballast apparatus is secured to the interior or exterior surface of the neck of the balloon usinq a double-faced adhesive tape.

BRIEF DESCRIPTION OF THE DRAWINGS

FIG. 7 is a top plan view of one alternate embodiment the ballast apparatus of this invention having the screw-type closure;

FIG. 8 is a side cross section view of the ballast apparatus of this invention taken through line 8—8 in FIG. 7 with the closure in the closed position; and FIG. 9 is a side cross section view of the ballast apparatus of this invention taken through line 8—8 in FIG. 7 with the closure in the open position.

DESCRIPTION OF THE PREFERRED EMBODIMENT

The ballast apparatus for use with a lighter-than-air balloon which is the subject of this invention is shown in FIGS. 1-9 and referenced generally therein by the numeral 10.

Figure 1:
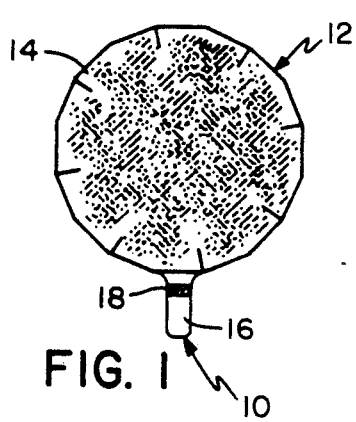
FIG. 1 is a front elevation view of a Mylar-type balloon with the ballast apparatus of this invention contained within the neck thereof.
Figure 2:
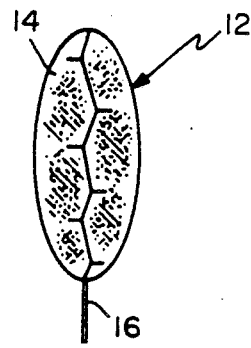
FIG. 2 is a side elevation view of the balloon of FIG. 1.

Referring particularly to FIG. 1, it may be seen that the ballast apparatus 10 is designed to be used particularly with a Mylar-type balloon 12 having a balloon body 14 and a neck 16 which may be sealed thermally or with an adhesive at a closure point 18 extending across the neck 16. The balloon 12 has an initial weight, and is inflated to a low internal pressure with a gas having a density less than that of air, thereby providing the inflated balloon 12 with a buoyancy sufficient to lift the weight of the balloon 12 and gas against gravity. The buoyant gas will permeate through the material forming the body 14 of the balloon 12 and diffuse at a predetermined rate, which in the case of a Mylar-type balloon 12 may be assumed to be relatively constant over prolonged periods such as several days. Similarly, various gases in air will permeate through the material forming the body 14 of the balloon 12 at different but relatively constant rates, thereby increasing the total weight of the balloon 12 and simultaneously reducing its buoyancy.

Figure 3:
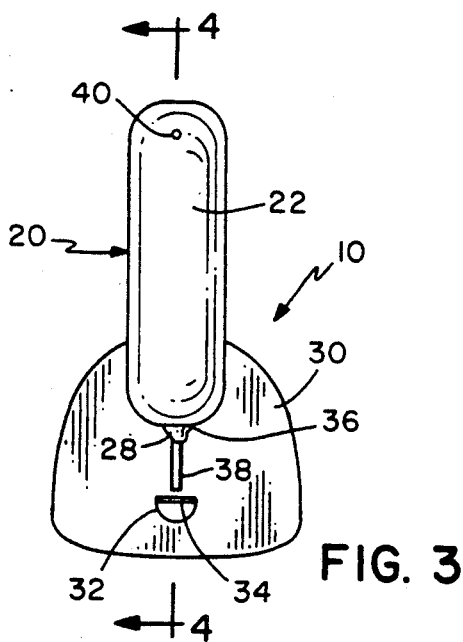
FIG. 3 is a top plan view of the ballast apparatus of this invention.
Figure 5:
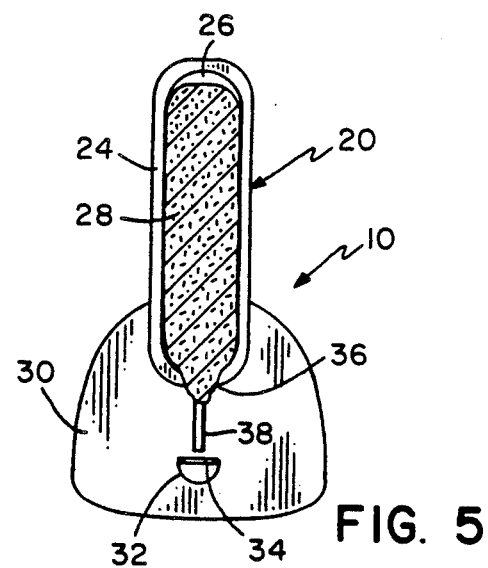
FIG. 5 is a top cross section view of the ballast apparatus of this invention taken through line 5—5 of FIG. 4.
Figure 4:
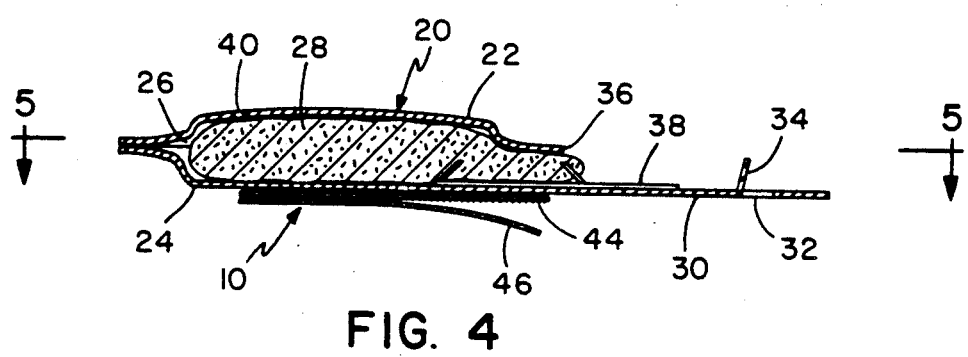
FIG. 4 is a side cross section view of the ballast apparatus of this invention taken through line 4—4 of FIG. 3.

Referring particularly to FIGS. 3-5, it may be seen that the ballast apparatus 10 may be seen to include a body or tube 20 formed from a top shell member 22 and a bottom shell member 24 which are joined or bonded together along the periphery thereof to form an elongated internal cavity 26. The shell members 22, 24 may be manufactured or molded from any suitable transparent or opaque plastic material which is generally nonporous to and nonsoluble in a preselected liquid, and which permits the shell members 22, 24 to be easily bonded together using a thermal or sonic welding process or an adhesive. The plastic material should preferably be relatively rigid, resistant to fracturing or cracking, and deformable by hand pressure. One such material that has proven suitable is transparent polystyrene having a thickness of less than one sixteenth of an inch.

As may be seen in FIGS. 4 and 5, a wicking material 28 is inserted into the cavity 26. The wicking material 28 is preferably one which will readily absorb and retain a preselected liquid, such as water. A material such as an open-celled polyethylene foam having a density of approximately 2.0-2.2 PCF has proven suitable for this purpose. The molecular structure of the wicking material 28 need not be absorbent itself, but in its manufactured state the wicking material 28 should retain the preselected liquid, and thereby exhibit common absorbent qualities.

The bottom shell member 24 defines an enlarged blade section 30 which is relatively flat or planar, and which may easily gripped by the fingers of a user. The blade section 30 defines a tethering opening 32 sufficiently large in diameter such that a cord or ribbon (not shown) may be threaded therethrough, the tethering opening being created by partially cutting a section of the blade section 30 to form a tab 34 which may be bent upwardly away from the planar surface of the blade section 30. The opening 32 and tab 34 are aligned along the longitudinal axis of the elongated tube 22.

Figure 6:
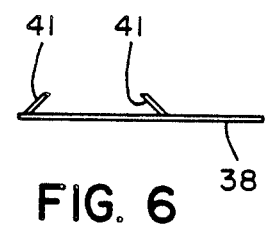
FIG. 6 is a side elevation view of the control slide of the ballast apparatus of FIG. 4.

The tube 22 defines an evaporation aperture 36 at the end thereof confronting the blade section 30, with one end of the wicking material 28 closely confronting or extending partially through the evaporation aperture 36 and being exposed to the air. The wicking material 28 is fastened to a control slide 38 which is bonded to or imbedded in the wicking material 28, and projects outwardly from the cavity 26 toward the tab 34. Referring to FIG. 6, it may be seen that the control slide 38 may include a pair of opposing barbs 41 which imbed within the wicking material 28 and permit the control slide 38 to move the wicking material 28 relative to the tube 22 and evaporation aperture 36 when the control slide 38 is repositioned relative to the blade section 30. The tab 34 acts as a backstop to prevent the control slide 38 and wicking material 28 from being extracted from the cavity 26 of the tube 22 unless the tab 34 is bent downwardly so as to be coplanar with the blade section 30.

The ballast apparatus 10 may be secured to the balloon 12 using a double-sided adhesive tape 44, from which a protective backing layer 46 is manually removed, and which may then be inserted into the hollow tubular neck 16 of the balloon 12 and securely fastened to the interior surface of one of the walls of the neck 16.

The adhesive tape 44 should be strong enough such that the ballast apparatus 10 will not become unintentionally disengaged from the balloon 10, but should permit the ballast device to be selectively removed and reapplied to the balloon 12.

In operation, a user places the blade section 30 and evaporation aperture 36 end of the tube 22 in a source of standing or running liquid, such as water, and permits the wicking material to become saturated with an aliquot of the liquid. The tube 22 may be squeezed or deformed and subsequently released in order to create a partial vacuum to assist the entry of the liquid into the tube 22. The user then removes the backing layer 46 from the adhesive tape 44, and securely attached the ballast apparatus 10 within the interior of the neck 16 of the balloon 10.

The user may then squeeze the tube 22 to remove small amounts of the liquid in order to achieve equilibrium or aerostatic flight. Over the course of several days, the balloon 12 may tend to lose its buoyancy and vary from the equilibrium condition by descending, and the user may extract the control slide 38 to expose a greater amount of the wicking material 28 through the evaporation aperture 36, thereby accelerating the rate of evaporation of the liquid to match the rate at which the baloon 12 loses its buoyancy. If the balloon 12 rises, the user may push the wicking material 28 further into the tube 22 using the control slide 38, to slow or decelerate the evaporation process for the liquid.

A pressure equalization aperture 40 is preferably placed opposite the evaporation aperture 36 in the tube 22, as shown in FIGS. 3 and 4.

It is also understood that the ballast apparatus 10 may preferably be constructed and packaged for use by balloon 12 vendors such that the ballast apparatus 10 is initially calibrated for use with a particular type of balloon 12. In this case, the manufacturer may use a premeasured aliquot of a selected liquid having a known molar heat of vaporization, surface tension, and density, a wicking material 28 with known absorbance and retention characteristics, and an evaporation aperture 36 of a predetermined diameter and shape, such that the rate of evaporation of the liquid will directly relate or correspond to a known rate of diffusion of the buoyant gas from the balloon 12, or more particularly to the rate at which the balloon 12 loses buoyancy over time. These values must be determined by experimentation for different types, sizes, and weights of balloons 12.

In such a case, it is deemed advantageous to select a wicking material 28 with the property of naturally changing its color depending upon the amount of liquid remaining in the wicking material 28, such as a litmus paper wick and an acidic or basic liquid. This allows the manufacturer to quickly verify by visual analysis during the manufacturing or packaging process, if one or more of the ballast apparatuses 10 has been incorrectly calibrated for a particular balloon 12.

Various alternate embodiments of the ballast apparatus have also been contemplated A sliding gate, cover, or exterior tube (not shown) may be used to surround and enclose the main tube 20 or a portion thereof, and to provide an adjustable closure for the evaporation aperture 36. In such a case, the evaporation aperture 36 should be positioned along the surface of the tube 20 rather than its end, so that the gate or cover lies in close parallel contact with the surface of the tube 20 and may be slidably positioned to cover all or a desired portion of the evaporation aperture 36. This allows for a semi-permanent seal over the evaporation aperture 36 for manufacturing and transporting the ballast apparatuses 10 prior to use, and would avoid the need for air-tight packaging when the individuals ballast apparatuses 10 are sold and shipped in bulk.

Referring to FIGS. 7 and 8, an embodiment of the ballast apparatus 10 is shown which utilizes a screw- or twist-type closure 42 similar to a stop-cock for controlling or limiting the rate of evaporation of the liquid. The screw-type closure 42 is achieved by extending the tube 22 adjacent the evaporation aperture 36 to form an elongated cylindrical neck 45 having external threads 46. The neck 45 may receive a cap member 48 having corresponding and cooperating internal threads 46, the cap member 48 defining one or more evaporation apertures 50 extending therethrough. The cap member 48 may be moved to a completely closed position as shown in FIG. 8, whereat the neck 45 covers or seals each of the evaporation apertures 50. The cap member 48 may be unscrewed from the neck 45 in order to gradually and continuously open the evaporation apertures 50, thereby exposing an increasing amount or portion of the wicking material 28 to the surrounding ambient air. In applications where the screw-type closure 42 is employed, a portion of the wicking material 28 preferably extends completely into the neck 45. In order for the user to be able to grasp the cap member 48, such as between the index finger and thumb, in order to rotate the cap member 48 relative to the ballast body 20 and move the cap member 48 along the neck 45, the blade section 30 may define an opening 52 through which the rear surface of the cap member 48 is exposed or projects. The cap member 48 may also be slidably mounted on the neck 45 so that the user can push or pull on the cap member 48 in order to gradually open or close the evaporation apertures 50.

In some applications, the wicking material 28 can be threaded or wound on a spool (not shown) and deployed or retracted as necessary to permit the proper exposure to the surrounding air.

Furthermore, in some applications it may be desirable to expose the entire wicking material 28 to the ambient air, absent any enclosure such as the tube 20. As such, the wicking material 28 may be formed into a predetermined shape of structure, and the selection of the wicking material 28 designed to achieve maximum absorption of the liquid when completely saturated. The article or structure comprising the wicking material 28 should then be highly absorbent to resist evaporation of the liquid, or alternately the liquid should have a very high molar heat of vaporization or very low vapor pressure, so that the rate of evaporation can be maintained at a constant level over a long period of time corresponding to the decrease in buoyancy of the balloon 12. The absorbent article may be attached to the balloon 12 either before or after a predetermined aliquot of the evaporative liquid is applied to the article. Since the article has a fixed weight, by moistening the absorbent article with a measure of liquid having a predetermined second weight, the weight of the article and the weight of the liquid combined should be such that the effect of gravity the moistened article is substantially equal in magnitude to and oppose the lifting force exerted by the balloon 12.

While the preferred embodiment of the above ballast apparatus 10 has been described in detail above with reference to the attached drawing figures, it is understood that various changes and adaptations may be made in the ballast apparatus 10 without departing from the spirit and scope of the appended claims.

What is claimed is:

1. A ballast apparatus for a lighter-than-air balloon including a balloon body filled with a buoyant gas and a neck portion, said balloon body having a predetermined weight, said buoyant gas producing a lifting force greater than said weight of said balloon body such that said balloon has a positive buoyancy in ambient air, said ballast apparatus comprising:
   a body defining a cavity and an evaporation aperture communicating with said cavity;
   a wicking material contained within said cavity which absorbs a liquid having a weight, the wicking material having an area exposed to the ambient air; and
   a securing means for attaching said body to the neck of the balloon,
whereby the wicking material is impregnated with the liquid, and the liquid evaporates from the wicking material through the evaporation aperture and the weight of the liquid in the wicking material decreases at a rate which corresponds substantially to the decrease in buoyancy of the balloon over time, thereby maintaining the balloon in an aerostatic condition for an extended period of time.

2. The ballast apparatus of claim 1 wherein a user may selectively adjust the amount of the exposed area of the wicking material.

3. The ballast apparatus of claim 1 wherein a user may selectively adjust the size of the evaporation aperture.

4. The ballast apparatus of claim 1 wherein a user may selectively adjust the position of the wicking material relative to the evaporation aperture, said ballast apparatus further comprising:
   a control slide, said control slide being fastened to said wicking material and extending outwardly from the cavity through the evaporation aperture.

5. The ballast apparatus of claim 1 wherein the ballast body further defines a neck region, said neck region receiving a cap member thereon in at least one selected position, said position of said cap member relative to said neck being selectively adjustable such that said cap member is moved relative to the ballast body, said cap member defining the evaporation aperture, said neck sealing at least a portion of said evaporation aperture when said cap member is moved relative to the ballast body.

6. The ballast apparatus of claim 5 wherein the neck defines a region of threads and wherein the cap member defines a second region of threads corresponding to and cooperating with said region of threads of the neck, whereby rotation of the cap member relative to the ballast body will selectively adjust the position of the cap member relative to the neck and adjust the size of the evaporation aperture.

7. A method of achieving a controlled aerostatic flight in a lighter-than-air balloon which loses buoyancy over time, said method comprising the steps of:
   attaching a wicking material to the balloon; and
   impregnating the wicking material with an aliquot of liquid having a weight, said liquid evaporating from said wicking material in air at room temperature at a rate of evaporation, said aliquot of said liquid and said rate of evaporation being such that said liquid evaporates from said wicking material and decreases said weight of said aliquot in generally direct corresponding relation to the loss of buoyancy of the balloon.

8. A method of achieving a controlled aerostatic flight in a lighter-than-air balloon which loses buoyancy over time, said method comprising the steps of:
   impregnating a wicking material with an aliquot of liquid having a weight, said liquid evaporating from said wicking material in air at room temperature at a rate of evaporation, said aliquot of said liquid and said rate of evaporation being such that said liquid evaporates from said wicking material and decreases said weight of said aliquot in generally direct corresponding relation to the loss of buoyancy of the balloon; and
   attaching said wicking material to the balloon.

9. The method of claim 8 wherein the liquid evaporates from the article over time such that the weight of the liquid retained by the article decreases corresponding to the rate at which the balloon loses buoyancy.

10. A method of achieving a controlled aerostatic flight in a lighter-than-air balloon which exerts a lifting force and which loses buoyancy over time at a known rate, said method comprising the steps of:
    moistening an absorbent article having a first weight with an aliquot of a liquid having a predetermined second weight, said first weight and said second weight being such that the effect of gravity on said absorbent article and said aliquot of liquid is substantially equal in magnitude to and opposes lifting force exerted by the balloon; and
    attaching said article to the balloon 11. A method of achieving a controlled aerostatic flight in a lighter-than-air balloon which exerts a lifting force and which loses buoyancy over time at a known rate, said method comprising the steps of:
    attaching an absorbent article having a first weight to the balloon; and
    moistening said absorbent article with an aliquot of a liquid having a predetermined second weight, said first weight and said second weight being such that the effect of gravity on said absorbent article and said aliquot of liquid is substantially equal in magnitude to and oppose the lifting force exerted by the balloon.

12. The method of claim 11 wherein the liquid evaporates from the article over time such that the weight of the liquid retained by the article decreases corresponding to the rate at which the balloon loses buoyancy.

* * * * *